US008103698B2

(12) United States Patent
Yin et al.

(10) Patent No.: US 8,103,698 B2
(45) Date of Patent: Jan. 24, 2012

(54) METHODS, APPARATUS AND MEDIA FOR SYSTEM MANAGEMENT OF OBJECT ORIENTED INFORMATION MODELS

(76) Inventors: Jianwen Yin, Round Rock, TX (US); Jody Buchanan, Round Rock, TX (US); Vishwanath Jayaraman, Austin, TX (US)

( * ) Notice: Subject to any disclaimer, the term of this patent is extended or adjusted under 35 U.S.C. 154(b) by 141 days.

(21) Appl. No.: 11/680,451

(22) Filed: Feb. 28, 2007

(65) Prior Publication Data
US 2008/0208896 A1 Aug. 28, 2008

(51) Int. Cl.
*G06F 17/30* (2006.01)
(52) U.S. Cl. .......................................... 707/802; 709/225
(58) Field of Classification Search .......... 719/315–316; 707/103
See application file for complete search history.

(56) References Cited

U.S. PATENT DOCUMENTS

| | | | |
|---|---|---|---|
| 5,784,584 A | 7/1998 | Moore et al. | |
| 5,920,870 A * | 7/1999 | Briscoe et al. ........................ | 1/1 |
| 6,389,464 B1 * | 5/2002 | Krishnamurthy et al. .... | 709/220 |
| 6,763,361 B1 * | 7/2004 | Poskanzer ..................... | 707/802 |
| 7,069,321 B1 * | 6/2006 | Curtis et al. .................. | 709/225 |
| 7,478,403 B1 * | 1/2009 | Allavarpu et al. ............. | 719/316 |
| 7,849,262 B1 * | 12/2010 | Glade et al. ................... | 711/114 |
| 2002/0065879 A1 * | 5/2002 | Ambrose et al. ............. | 709/203 |
| 2002/0144009 A1 * | 10/2002 | Cheng et al. .................. | 709/314 |
| 2003/0005090 A1 * | 1/2003 | Sullivan, Jr. et al. ......... | 709/220 |
| 2003/0135665 A1 * | 7/2003 | Barker et al. ................. | 709/328 |
| 2003/0204557 A1 * | 10/2003 | Mandal et al. ................ | 709/202 |
| 2003/0236875 A1 * | 12/2003 | Green et al. .................. | 709/224 |
| 2004/0024863 A1 * | 2/2004 | Connor et al. ................ | 709/224 |
| 2004/0117438 A1 * | 6/2004 | Considine et al. ............ | 709/203 |
| 2004/0186906 A1 * | 9/2004 | Torrant et al. ................. | 709/225 |
| 2005/0138040 A1 * | 6/2005 | Lamb et al. ................... | 707/100 |
| 2005/0193109 A1 * | 9/2005 | Hudis et al. ................... | 709/223 |
| 2006/0041559 A1 * | 2/2006 | Baldwin et al. ................ | 707/10 |
| 2007/0073877 A1 * | 3/2007 | Boykin et al. ................ | 709/225 |

OTHER PUBLICATIONS

"Unified Service Level Monitoring using CIM," by Debusmann et al. In: Proc. of the Seventh IEEE Int'l Enterprise Distributed Object Computing Conference (2003). Available at: IEEE.*

(Continued)

*Primary Examiner* — Neveen Abel Jalil
*Assistant Examiner* — Daniel Kinsaul
(74) *Attorney, Agent, or Firm* — Garrana Tran LLP; Andrea E. Tran

(57) ABSTRACT

A computer implemented method is disclosed including receiving a client request from a client within an object-oriented model and intercepting said client request with a client abstraction layer able to communicate with said client and a management layer database. The method further includes generating with said client abstraction layer a request for information from said management layer database, wherein said database comprises information describing each managed object of said object-oriented model. An information handling system is further disclosed including a processor and memory accessible by the processor. The system further includes instructions stored on the memory that when carried out cause the system to initialize a discovery process identifying each managed object of the information handling system. The instructions further cause the system to add to a management layer database created by a client abstraction layer, the management layer database comprising information describing each managed object of said system any new information describing the managed object of the system, wherein said new information is not already present in the management layer database, and wherein said database is created when said instructions are installed on said system.

16 Claims, 3 Drawing Sheets

OTHER PUBLICATIONS

"Fundamentals of Relational Database Design," by Paul Litwin. Available at least prior to Jan. 1, 2007 (see search notes). Available at: http://www.deeptraining.com/litwin/dbdesign/FundamentalsOfRelationalDatabaseDesign.aspx Last visited: May 25, 2011.*

"Relational Databases 101: Looking At the Whole Picture," by Scott W. Ambler. Available at least prior to Jan. 1, 2007 (see search notes). Available at: http://www.agiledata.org/essays/relationalDatabases.html Last visited: May 25, 2011.*

* cited by examiner

METHODS, APPARATUS AND MEDIA FOR SYSTEM MANAGEMENT OF OBJECT ORIENTED INFORMATION MODELS

BACKGROUND

1. Technical Field

The present disclosure relates generally to information handling systems and more particularly to object-oriented management information models.

2. Background Information

As the value and use of information continues to increase, individuals and businesses seek additional ways to process and store information. One option available to users is an information handling system. An information handling system generally processes, compiles, stores, and/or communicates information or data for business, personal, or other purposes thereby allowing users to take advantage of the value of the information. Because technology and information handling needs and requirements vary between different users or applications information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As the capabilities, diversity, and size of information systems and networks continue to increase the complexity of system management also increases. Developing and unifying management standards for desktop, enterprise and Internet environments is a main goal of the Distributed Management Task Force Inc. (DMTF). DMTF standards are platform-independent and technology neutral, and facilitate cost effective system management. The DMTFrs Common Information Model (CIM) standard is an object-oriented management information model that unifies and extends existing management standards, such as for example, Simple Network Management Protocol (SNMP), Desktop Management Interface (DMI), and Common Management Information Protocol (CMIP). The CIM specification defines the syntax and rules of the model and how CIM can be integrated with other management models, while the CIM schema comprises the descriptions of the models. The CIM schema currently defines thousands of classes with properties, methods and associations that represent components of a system such as, but not limited to, fans, power supplies, processors, and firmware. The classes are organized by namespaces, which function as logical databases. DMTF Profiles are specifications that define the CIM model and associated behavior for a management domain. The profiles define requirements regarding the classes and associations used to represent the management information in a given management domain. Generally, within a CIM Object Manager (CIMOM), profiles are implemented by different providers in one or more namespaces. The CIMOM provides an interface, which allows a provider to expose the instances of CIM classes, and a client application to read and/or write properties and invoke methods.

With respect to client-side system management of CIM, there may be limitations and drawbacks with the current implementations. For example, the current design of a CIM client requires built-in knowledge of the CIM model. The CIM model, however, evolves rapidly thus the built-in knowledge may become insufficient. There exists a lack of uniformity and/or interoperability as different operating systems (OS) have different implementations of CIMOMs, and different platforms have different components. Current CIM implementations may also suffer from efficiency problems. For example, in order to get system management information using current implementations, multiple queries going through multiple namespaces and classes are required which can be very time consuming. As one non-limiting example, in order to retrieve the asset information in a data center, a CIM client currently must traverse through the interop namespace to find the registered profiles, then go through the ElementConformsToProfile association to the managed component namespace and find the chassis class, and finally retrieve the asset information. For each server, the CIM client must traverse at least three classes and two namespaces in order to retrieve the information. A managed system such as a data center may comprise hundreds of thousands of machines, and performing this action on each machine is very time consuming. As another example, generally when a CIM client tries to retrieve information from a CIMOM a certain CIM provider is called to perform the action. This approach is not very efficient when multiple CIM client calls are sent to retrieve system management information at one time, for example, when multiple calls are sent to a main graphical user interface (GUI) page of a server management or storage management page. The current implementations also lack efficient management of dynamic systems wherein components may be hot-plugged to devices, such as, but not limited to, Storage Area Networks (SANs) or Network Attached Storages (NASs). Moreover, current system management implementations require proprietary clients and do not provide a CIM client capable of carrying out platform-independent, operating system-independent, and CIM schema version-independent system management.

The methods, apparatus and products of the present disclosure may provide a management layer operable between a client and an object manager in an object-oriented model (OOM). The present management layer is also referred to herein as a client abstraction layer (CAL). The methods, apparatus and products of the present disclosure are client-side implementations. The management layer of the present disclosure overcomes the need to perform multiple queries through multiple layers in order to retrieve system management information. In addition, a variety of system management applications such as, but not limited to, inventory collection, change management, and system monitoring, can be easily built upon this management layer. Unlike conventional system management implementation, the present management layer media and methods are platform-independent, operating system-independent, and OOM schema version-independent.

SUMMARY

The following presents a general summary of some of the many possible embodiments of this disclosure in order to provide a basic understanding of this disclosure. This summary is not an extensive overview of all embodiments of the disclosure. This summary is not intended to identify key or critical elements of the disclosure or to delineate or otherwise limit the scope of the claims. The following summary merely presents some concepts of the disclosure in a general form as a prelude to the more detailed description that follows.

According to one non-limiting embodiment there is provided a computer implemented method comprising receiving a client request from a client within an object-oriented model, intercepting the client request with a client manager able to communicate with the client and a management database, and generating with the client manager a request for information from the management database, wherein the database comprises information describing each managed object of the object-oriented model. Generally the database is created by the client manager when the client manager is installed on an information handling system of the model. The method may comprise receiving requested information in response to the request for information with the client manager from the database. The method may comprise providing the requested information from the client manager to the client. The method may comprise generating with the client manager the request for information from an object manager of the model, receiving with the client manager requested information from the object manager, providing the requested information from the client manager to the client, and updating the database with the requested information from the object manager. The method may comprise initializing a discovery process identifying each managed object of the model, and adding to the database any new information not present in the database wherein the new information describes a managed object of the model. Generally the object-oriented model is a common information model (CIM).

According to another non-limiting embodiment there is provided an information handling system comprising a processor, memory accessible by the processor, and instructions stored on the memory that when carried out cause the system to initialize a discovery process identifying each managed object of the information handling system: and add to a database comprising information describing each managed object of the system any new information describing the managed object of the system, wherein the new information is not already present in the database and wherein the database is created when the instructions are installed on the system. The system may comprise instructions that when carried out cause the system to receive a client request from a client within an object/oriented model, intercept the client request with a client manager able to communicate with the client and a management database, and generate with the client manager a request for information from the management database. The system may comprise instructions that when carried out cause the system to receive requested information in response to the request for information with the client manager from the database. The system may comprise instructions that when carried out cause the system to provide the requested information from the client manager to the client. The system may comprise instructions that when carried out cause the system to generate with the client manager a request for information from an object manager of the model, receive with the client manager the requested information from the object manager, provide the requested information from the client manager to the client, and update the database with the requested information from the object manager. Generally the object-oriented model is a common information model (CIM).

According to another embodiment there is provided a computer readable medium having stored thereon instructions that when carried out on an information handling system cause the system to initialize a discovery process identifying each managed object of the system, and add to a database comprising information describing each managed object of the system any new information describing the managed object of the system, wherein the new information is not already present in the database, and wherein the database is created when the instructions are installed on the system. The medium may comprise instructions that when carried out cause the system to receive a client request from a client within an object-oriented model, intercept the client request with a client manager able to communicate with the client and the database, and generate with the client manager a request for information from the database. The medium may comprise instructions that when carried out cause the system to receive with the client manager the requested information from the database. The medium may comprise instructions that when carried out cause the system to provide the requested information from the client manager to the client. The medium may comprise instructions that when carried out cause the system to generate with the client manager the request for information from an object manager of the model, receive with the client manager the requested information from the object manager, provide the requested information from the client manager to the client, and update the database with the requested information from the object manager. Generally the object-oriented model is a common information model (CIM).

Another aspect of the present disclosure provides for a computer implemented method. The method may include receiving a client request from a client within an object-oriented model and intercepting said client request from an object manager with a client abstraction layer. The client abstraction layer may be in communication with said client, said object manager, and a management layer database. Furthermore, the method may include generating with said client abstraction layer a request for information from said management layer database. The database may comprise information describing each managed object of said object-oriented model.

Another aspect of the present disclosure provides for a information handling system. The system may include a process and memory accessible by the processor. Furthermore, the system may include instructions stored on the memory that when carried out cause the system to initialize a discovery process identifying each managed object of the information handling system. Additionally, the instructions may cause the system to add to a management layer database created by a client abstraction layer. The management layer database may comprise information describing each managed object of said system any new information describing the managed object of the system, wherein said new information is not already present in the management layer database, and wherein said database is created when said instructions are installed on said system. Furthermore, the instructions may cause to the system to receive a client request from a client within an object oriented model and intercept said client request from an object manager with the client abstraction layer. The client abstraction layer may be in communication with the client, the object manager, and the management layer database.

Yet another aspect of the present disclosure provides for a computer readable medium having stored thereon instructions that when carried out on an information handling system causes the system to initialize a discovery process identifying each managed object of the information handling system. Additionally, the instructions may cause the system to add to a management layer database created by a client abstraction layer. The management layer database may comprise information describing each managed object of said system any new information describing the managed object of the system, wherein said new information is not already present in the management layer database, and wherein said database is created when said instructions are installed on said system. Furthermore, the instructions may cause to the system to receive a client request from a client within an object oriented model and intercept said client request from an object manager with the client abstraction layer. The client abstraction layer may be in communication with the client, the object manager, and the management layer database.

Another aspect of the present disclosure provides for a computer implemented method. The method may include receiving a client request from a client for information of one of a plurality of managed objects within an object-oriented model. The method may further include intercepting said client request to the one of a plurality of managed objects with a management layer for managing each of the plurality of managed objects. The management layer is in communication with the client and each object manager installed on each of the plurality of managed objects. Further, the method may include populating a management layer database by utilizing at least one of a plurality of database tables based on at least one parameter able to identify the each of the plurality of managed objects. The management layer database is in communication with the management layer. Further still, the method may include generating with the management layer a response for the client request for the information of the one of a plurality of managed objects from said management layer database to the client.

Another aspect of the present disclosure provides for a information handling system. The system may include a process and memory accessible by the processor. Furthermore, the system may include instructions stored on the memory that when carried out cause the system to initialize a discovery process identifying each of a plurality of managed objects of the information handling system. Additionally, the instructions may cause the system to add to a management layer database created by a management layer at least one new information of one of the plurality of managed objects within an object oriented model. The management layer database comprising at least one of a plurality of database tables based on at least one parameter able to identify the each of the plurality of managed objects. The information is updatable. The database is created when said instructions are installed on said system. Further, the instructions may cause the system to receive a client request from a client for information of one of the plurality of managed objects within the object oriented model. Further still, the instructions may cause the system to intercept said client request to the one of the plurality of managed objects with the management layer for managing each of the plurality of managed objects. The management layer is in communication with the client and each object manager installed on each of the plurality of managed objects.

Yet another aspect of the present disclosure provides for a computer readable medium having stored thereon instructions that when carried out on an information handling system causes the system to initialize a discovery process identifying each of a plurality of managed objects of the information handling system. Additionally, the instructions may cause the system to add to a management layer database created by a management layer at least one new information of one of the plurality of managed objects within an object oriented model. The management layer database comprising at least one of a plurality of database tables based on at least one parameter able to identify the each of the plurality of managed objects. The information is updatable. The database is created when said instructions are installed on said system. Further, the instructions may cause the system to receive a client request from a client for information of one of the plurality of managed objects within the object oriented model. Further still, the instructions may cause the system to intercept said client request to the one of the plurality of managed objects with the management layer for managing each of the plurality of managed objects. The management layer is in communication with the client and each object manager installed on each of the plurality of managed objects.

BRIEF DESCRIPTION OF THE DRAWINGS

The following drawings illustrate some of the many possible embodiments of this disclosure in order to provide a basic understanding of this disclosure. These drawings do not provide an extensive overview of all embodiments of this disclosure. These drawings are not intended to identify key or critical elements of the disclosure or to delineate or otherwise limit the scope of the claims. The following drawings merely present some concepts of the disclosure in a general form. Thus, for a detailed understanding of this disclosure, reference should be made to the following detailed description, taken in conjunction with the accompanying drawings, in which like elements have been given like numerals.

DETAILED DESCRIPTION

Figure 1:
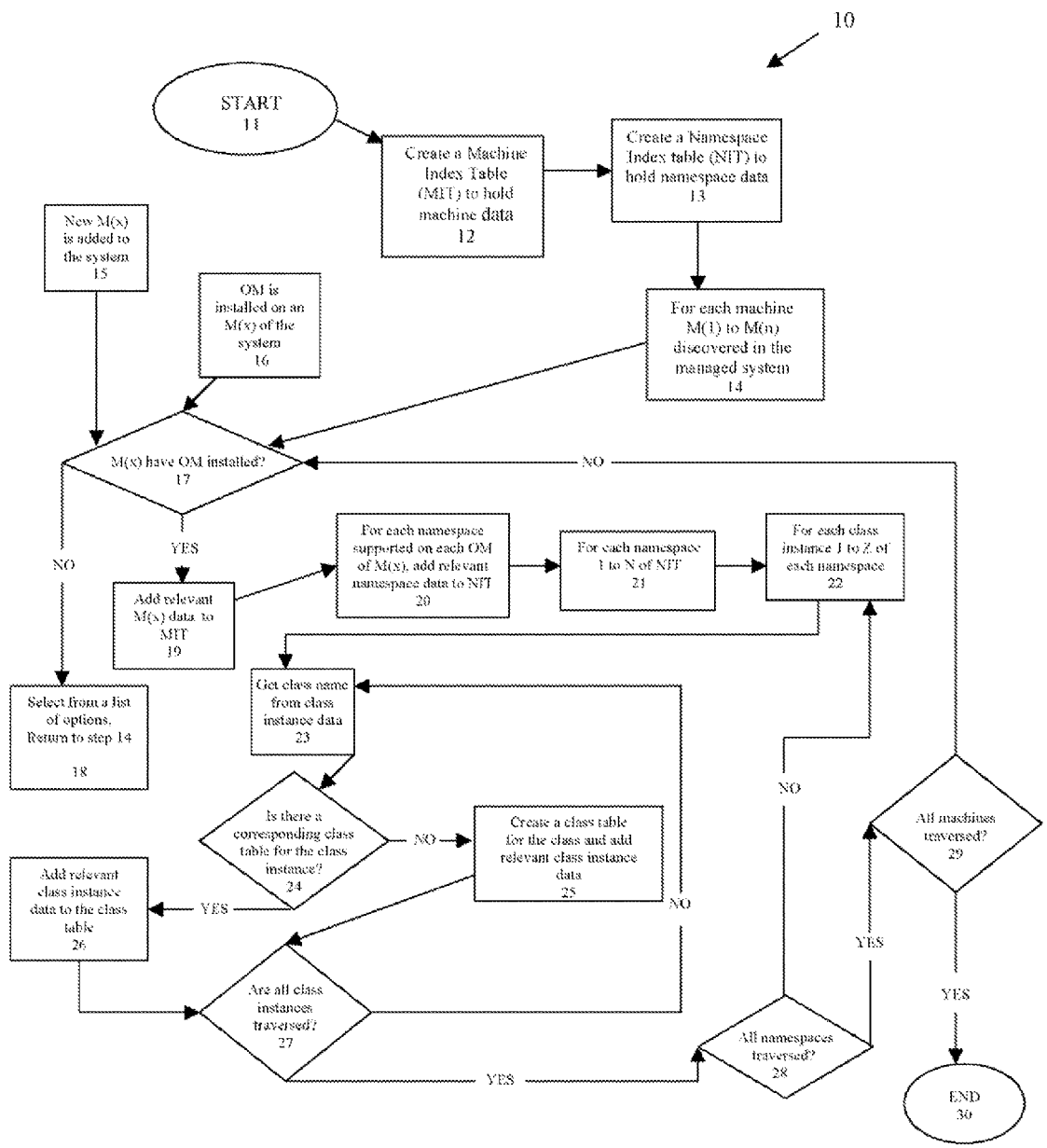
FIG. 1 is a flowchart illustrating one example method for populating a management layer database of the disclosure.

For the purposes of this disclosure, an embodiment of an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a network storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. The CPU may comprise a processor, a microprocessor, minicomputer, or any other suitable device, including combinations and/or a plurality thereof, for executing programmed instructions. The CPU may be in data communication over a local interface bus with components including memory and input/output interfaces. Non-volatile memory includes, but is not limited to, firmware flash memory and electrically erasable programmable read-only memory (EEPROM). The firmware program may contain, programming and/or executable instructions required to control a keyboard, mouse, video display and/or other input/output devices not shown here. The OS and application programs may be loaded into RAM for execution.

Additional components of the IHS may include one or more disk drives, one or more network ports for communicating with external devices as well as various input and output (I/O) devices, such as a keyboard, a mouse, and a video display. Furthermore, a network port may allow multiple IHSs to communicate over a network such as a local area network (LAN) or a wide are network (WAN), such as the Internet. The IHS may also include one or more buses operable to transmit data communications between the various hardware components.

The methods, apparatus and products of the present disclosure provide a system management layer operable between clients and object managers in an object-oriented model. Unlike conventional system management implementation, the present client-side management system is platform-independent, operating system-independent, and OOM schema version-independent. The management layer of the disclosure may also be referred to herein as a client abstraction layer (CAL).

The management layer of the present disclosure allows client-side creation of at least one database, which may serve as a cache for information describing a managed system of interest. The database also maps the managed components of a system of interest. For example, the management layer database may comprise a machine index table (MIT) comprising data about each machine of the system, for example, but not limited to, the name of each machine and its IP address. The database may comprise a namespace index table (NIT) comprising data about each namespace supported by each machine. The database may comprise a class table (CT) comprising class instance data, including, but not limited to, class properties, name of the machine, and namespace information. The management layer database may comprise any one or more of these or any other database table comprising information relating to the system of interest. For example, a class table database may be created for each unique class found on the one or more machines of a managed system. As another example, more than one machine index database table may be created wherein each table groups and/or identifies the machines of the system based on a parameter specific to the table. Non-limiting examples of different machine index database tables include, but are not limited to, an MIT1 which lists all machines on a system having an object manager (OM) installed, and an MIT2 for which lists machines of the system that do not have an OM installed.

With respect to the data fields of the tables of the management layer databases of the disclosure, they may be any fields. There may be any one or more data fields for each table, and there may be redundancy in one or more data fields from one table to another table. Generally, a data field comprises information useful in identifying the corresponding object. A data field may comprise information unique to the corresponding object.

The information stored in the database may be any data relating to any aspect of the managed machines. The information may be static, stable, or real-time data. Static information is defined herein as information that does not change and includes data such as, but not limited to, service tags and serial numbers. Stable information is defined herein as information that may change, but generally does so only over a large time interval (i.e., the change is not frequent enough for the information to be considered "real-time" information). Stable information includes data such as, but not limited to, firmware versions and BIOS versions. Real-time information is data that may change over a small time interval and includes data such as, but not limited to, fan speeds, temperature probe readings, and free and/or used disk space on a system. With respect to stable and real-time information, updates may be made to the database as desired, and/or as changes occur. Any one or combination of techniques known by one of skill in the art for updating databases is suitable for use herein. One non-limiting approach for updating the management layer database for any changes in stable and/or real-time information is to subscribe to any indications that may exist for the information. The change itself may be the triggering event for the indication. Another non-limiting approach for updating the database for any changes in stable and/or real-time information, and one that is especially useful for those situations in which there is no indication related to the information, is to establish a time interval t for polling information to the database. The database is thus updated for any changes in information which may occur during time t.

A client may request and retrieve any information in the management layer database. One non-limiting advantage of the management layer of the present disclosure is that a client is able to request and retrieve information relating to any one or more machines of the managed system directly from the management layer database instead of having to request information from each individual machine's object manager. Thus, the information retrieval methods of the present disclosure are efficient and possess a short response time. The efficiency provided by the present system management implementations are especially apparent in, but in no way limited to, managed systems comprising a very large number of machines, for example a data center. Considering that the average response time for a query sent to one OM is several seconds, the time taken to gather information from each OM in an example data center with a hundred servers with a hundred enclosures may easily accumulate into many minutes. However, with the management implementations of the present disclosure, the same query may generally take only 10-15 seconds since the query is sent to a management layer database where the information is cached. In addition, a management layer database of the present disclosure may be accessed by any client and does not require a proprietary client, and thus has a broad range of applicability. With respect to the relationship between the client abstraction layer of the present disclosure and a client of an OM, the CAL is transparent to the client.

Referring now to FIG. 1, non-limiting flowchart 10 illustrates one non-limiting example method for populating a management layer database of the disclosure. Various methods are contemplated comprising all or less than all of the steps shown in FIG. 1, any number of repeats of any of the steps shown, and in any order. The method may begin in step 11 when the management layer application is initialized. The management layer application may initialize when it is installed on any one or more machines of a managed system/network of interest, or any one or more machines able to access a managed system/network of interest. The management application may also be configured to begin a discovery process after reboot of a machine onto which it is installed. In step 12, a machine index table (MIT) may be created. Generally the MIT is a database table set up to comprise data describing each machine of the managed system of interest. The MIT may comprise data entries for any one or more identifier for each machine of the managed system such as, but not limited to, a machine's name, a machine's IP address. It is within the scope of the disclosure for the method to comprise creating more than one machine index table wherein each table groups and/or lists machines based on a parameter unique to the table. In step 13, a namespace index table (NIT) may be created. Generally the NIT is a database table set up to comprise data describing each namespace on the machines of the system of interest. The NIT may comprise data describing each namespace such as, but not limited to, the name of the machine and the namespaces associated with each machine. In alternative embodiments, additional tables may be created and may be the same type as or different from those illustrated in FIG. 1.

In step 14, each machine (M) of the managed system may be identified/discovered, and may be processed according to the method. There may be any number of machines M(1) to M(n) within a managed system. In step 17, it may be determined whether an object manager is installed on the machine M(x). If no, an object manager is not installed on machine M(x), then in step 18 the client may choose one or more options from a list of options. The method may then return to step 14 and the next machine M(x) from the list is processed. The client may choose to not select any of the options from the list and the method may directly return to step 14. The list of options provided to the client in step 18 may include any options in the art suitable for use herein. The list of options may include, but is not limited to, any of the following examples: skipping the machine that does not have an OM installed; generating an error message indicating no OM is installed on the machine; identifying the machine by name and/or IP address; creating a table, if one does not already exist, for listing the machines without an OM installed thereon and adding the machine to the list; installing an OM on the machine and proceeding with step 19; and any combinations thereof.

If the answer to step 17 is yes, an object manager is installed on M(x), then in step 19 the M(x) data relevant to the data fields of the MIT created in step 12, such as name and/or IP address, may be added to the MIT. In step 20, each namespace supported on the object manager of M(x) may be identified/discovered, and the namespace data relevant to the data fields of the NIT created in step 13, for example, namespace and/or machine name of M(x) may be added to the NIT. In step 21, each namespace 1 to N of the NIT may be identified. In step 22, for each namespace identified in step 21, each class instance 1 to Z in the namespace may be identified. In step 23, for each class instance identified in step 22, the corresponding class name (CN) may be identified. In step 24, for each unique class identified in step 23, it may be determined whether a class table (ON) corresponding to the class exists. If no, a corresponding CN table does not exist for the class, a CN table may be created in step 25. Generally the ON is a database table set up to comprise data describing each instance of a class of a managed system of interest. A separate CN may be created for each unique class of a managed system. Each CN table may comprise data entries for any one or more data fields such as, but not limited to, class properties, machine name, and namespace information, and any other data describing each instance of the class. Returning to step 24, if the answer is yes, a corresponding CN table exists for the class, then in step 26, the relevant class instance data may be added to the existing CN table. In step 27 it may be determined whether all class instances have been traversed. If no, then the method may return to step 23 and the next class instance in the list 1 to Z may be traversed. If the answer to step 27 is yes, all class instances have been traversed, then in step 28 it may be determined whether all namespaces have been traversed. If no, then the method may return to step 22 and the next namespace in the list 1 to N may be traversed. If the answer to step 28 is yes, all namespaces have been traversed, then in step 29 it may be determined whether all machines have been traversed. If no, then the method may return to step 17 and the next machine in the list of machines M(1) to M(n) may be traversed. If the answer to step 29 is yes, all machines have been traversed, then the method may end in step 30.

Referring back to step 17, in alternative embodiments of methods of the disclosure there may be additional activation points for a discovery process of the disclosure. That is, any change in a managed system of interest may be configured to be a triggering event for a discovery process of the disclosure which may begin, for example at step 17, or at step 14, of the non-limiting method shown in FIG. 1. For example, if a new machine is added to a managed system of interest (depicted as step 15 in FIG. 1), it may be desired that the new machine undergo a discovery process and any relevant information relating to the new machine be added to the management layer database. In this example, the addition of the new machine may serve as a triggering event for a discovery process, and activate a discovery method of the disclosure beginning, for example, at step 17 of FIG. 1. Another example is if an OM were installed on a machine of the system, which previously lacked an OM (depicted as step 16 in FIG. 1). In this case, the installation of the OM on the machine may serve as a triggering event for a discovery process of the disclosure beginning, for example, at step 17 depicted in FIG. 1.

Figure 2:
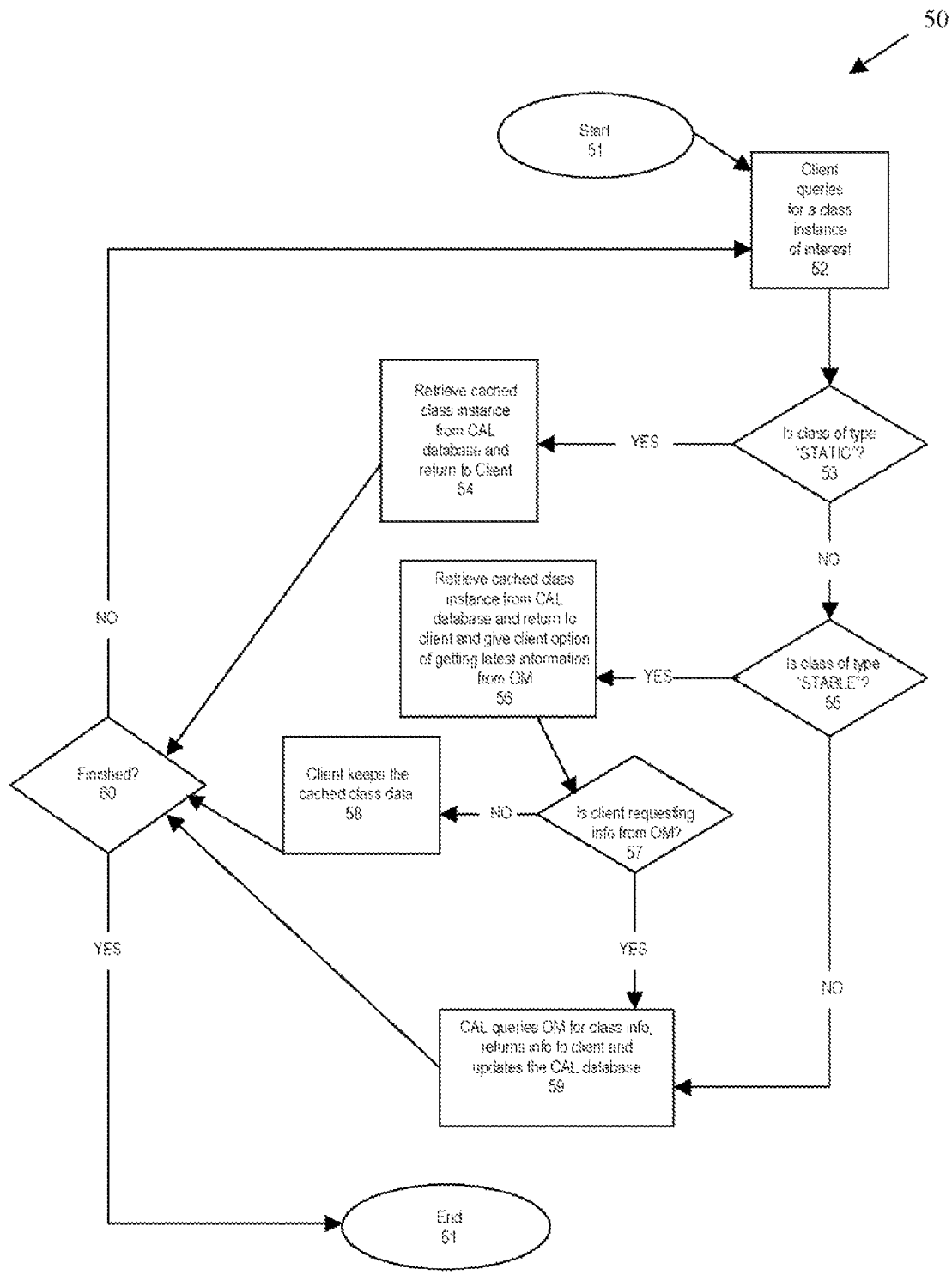
FIG. 2 is a flowchart illustrating one example method for retrieving data from a management layer database of the disclosure.

Referring now to FIG. 2, depicted is flowchart 50 illustrating an example method for retrieving information retrieving information from a management layer database of the disclosure wherein the information relates to one or more managed components of an object-oriented model. In one non-limiting embodiment, the model is a CIM and the managed components are information handling systems of a system of interest, and the namespaces and classes of each IHS. Various methods are contemplated comprising all or less than all of the steps shown in FIG. 2, any number of repeats of any of the steps shown, and in any order. A non-limiting example of one data retrieval method begins in step 51. In step 52 the client may request information relating to a class instance of interest, and the request may be processed by the client abstraction layer. In step 53, it may be determined whether the requested class instance information is static information. If yes, then in step 54 the class instance information may be retrieved from the management layer database and returned to the client. If the answer to step 53 is no, the requested information is not static, then in step 55 it may be determined whether the information is "stable". If yes, then in step 56 the class instance information may be retrieved from management layer database and returned to the client. In step 57 the client may choose to obtain the information from the OM. If the answer to step 57 is no, the client does not choose to request information from the OM, then in step 58 the client may keep the cached class instance data provided in step 56. If the answer to step 57 is yes, the client chooses to request the information from the OM, then in step 59 the CAL queries the OM for the class information, the information is returned to the client and the CAL database is updated with the information. The option to retrieve information from the OM may be desired in order to overcome a possible situation in which there has been a change in the stable information not yet reflected in the database. For example, if a change in information occurs, yet an indication does not exist for the change, the database may not reflect the change in the information. Or, if a change in information is sent to the database as a result of a polling event yet the time period for the polling event has not yet lapsed, then the database may not reflect the change in information.

Referring back to step 55, if the answer is no, the class is not of the type "stable", then in step 59 the CAL queries the OM for class information, the information is returned to the client and the management layer database is updated.

After each of steps 54, 58, and 59, it may be determined in step 60 whether the client is finished retrieving information. If no, the client is not finished, then the method may return to step 52 and the client may submit another query. If the answer in step 60 is yes, the client is finished retrieving information, then the method may end in step 61.

Figure 3:
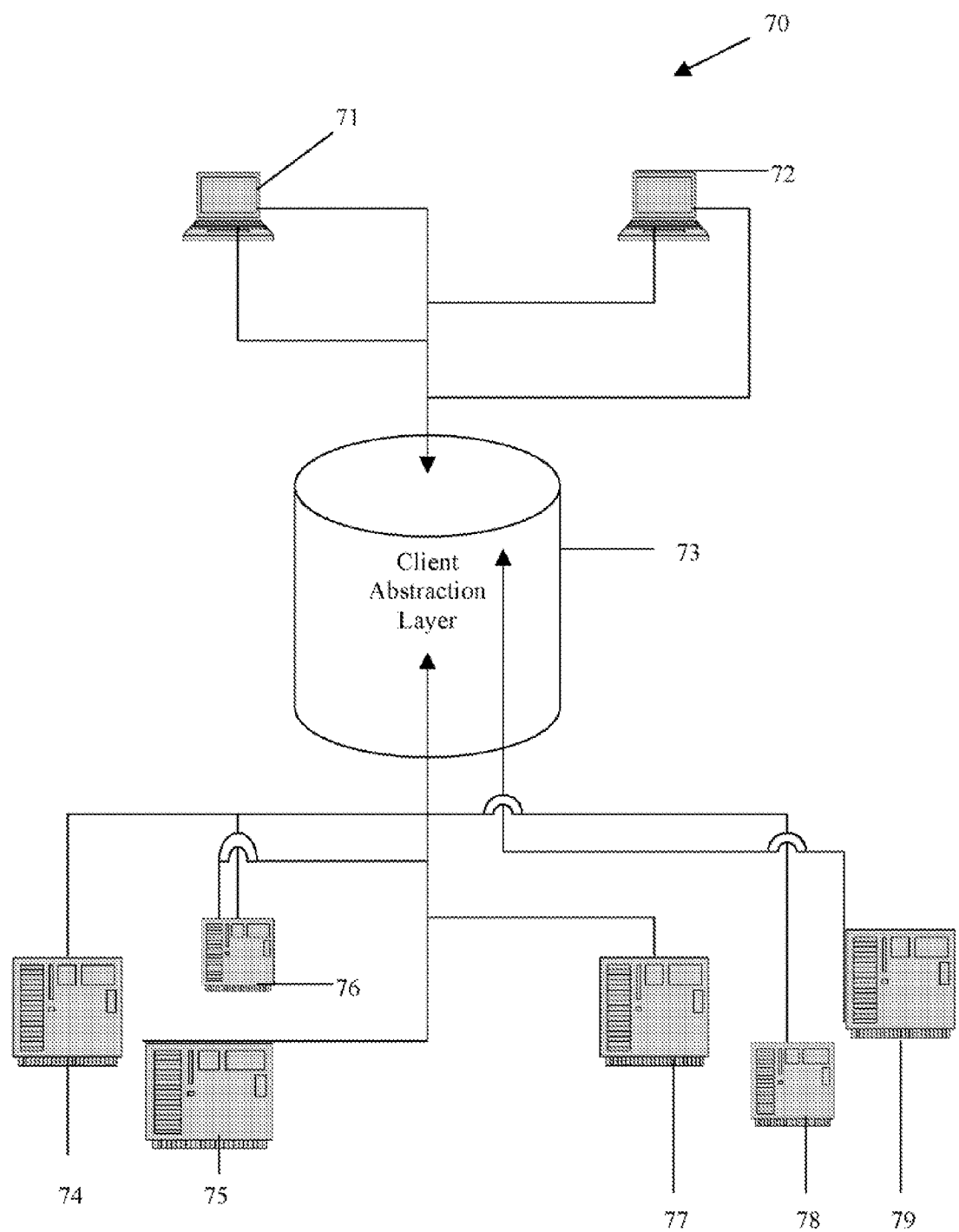
FIG. 3 depicts non-limiting relationships between a management layer of the disclosure and clients and object managers in an object-oriented information model.

Referring now to FIG. 3, non-limiting map 70 depicts relationships between clients 71 and 72 and object managers 74-79 of an example object-oriented model, and a client abstraction layer/management layer 73 of the present disclosure. As stated previously, the CAL is transparent to the clients. In one non-limiting embodiment, the model is a CIM and the object managers are CIMOMs. The object managers may be any object managers for example, but not limited to, servers and storage devices.

In some embodiments, part or all of the models/data structures described herein may be stored on one or more information handling system readable media or transmitted in a propagated signal. In other embodiments, part or all of the methods described herein may be described as instructions for an information handling system, and stored on one or more information handling system readable media or transmitted by a propagated signal. In even other nonlimiting embodiments, there are contemplated information handling systems comprising the above described readable media containing the models/data structures and/or instructions.

Portions of the present disclosure, detailed description and claims may be presented in terms of logic, software or software implemented aspects typically encoded on a variety of media including, but not limited to, computer-readable media, machine-readable media, program storage media or computer program product. Such media may be handled, read, sensed and/or interpreted by an information handling system (IHS). Those skilled in the art will appreciate that such media may take various forms such as cards, tapes, magnetic disks (e.g., floppy disk or hard drive) and optical disks (e.g., compact disk read only memory ("CD-ROM") or digital versatile disc ("DVD")). It should be understood that the given implementations are illustrative only and shall not limit the present disclosure.

The present disclosure is to be taken as illustrative rather than as limiting the scope or nature of the claims below. Numerous modifications and variations will become apparent to those skilled in the art after studying the disclosure, including use of equivalent functional and/or structural substitutes for elements described herein, use of equivalent functional couplings for couplings described herein, and/or use of equivalent functional actions for actions described herein. Any insubstantial variations are to be considered within the scope of the claims below.

What is claimed is:

1. A computer implemented method comprising:
    initializing a discover process identifying each managed object of the model; and
    adding to said database any new information not present in the database wherein said new information describes a managed object of the model;
    receiving a client request from a client for information directed to one of a plurality of managed objects within an object-oriented model;
    intercepting said client request to the one of a plurality of managed objects with a client abstraction management layer database for managing each of the plurality of managed objects, wherein the client abstraction management layer is in communication with the client and each of the plurality of managed objects having an object manager installed thereon;
    populating the client abstraction management layer database with at least one of a plurality of database tables based on at least one parameter able to identify said each of the plurality of managed objects;
    updating the client abstraction management layer database with changes to the at least one parameter, wherein the step of updating the client abstraction management layer database is periodically effected;
    generating with the client abstraction management layer a response for the client request for the information directed to the one of a plurality of managed objects from said client abstraction management layer database.

2. The method of claim 1 wherein said client abstraction management layer database is created by the client abstraction management layer when the client abstraction management layer is installed on an information handling system of said object-oriented model.

3. The method of claim 1 further comprising
    providing said requested information from the client abstraction management layer to said client and wherein the step of updating the client abstraction management layer database occurs when a change to the status of a managed object is detected.

4. The method of claim 3 further comprising
    generating with the client abstraction management layer a client abstraction management layer request for information from an object manager of said model,
    receiving with the client abstraction management layer requested information from said object manager,
    providing said requested information from the client abstraction management layer to said client, and
    updating said database with said requested information from said object manager.

5. The method of claim 1, wherein said object-oriented model is a common information model (CIM).

6. An information handling system comprising:
    a processor;
    memory accessible by the processor; and
    instructions stored on the memory that when carried out cause the system to:
        initialize a discovery process identifying managed objects of the information handling system;
        add to a client abstraction management layer database created by a client abstraction management layer at least one new information of one of the plurality of managed objects within an object oriented model having an object manager installed, the client abstraction management layer database comprising at least one of a plurality of database tables based on at least one parameter able to identify each of the plurality of managed objects, the database tables being updatable, and said database being created when said instructions are installed on said system;
        receive a client request from a client for information directed to one of the managed objects within the object oriented model;
        intercept said client request to the one of the plurality of managed objects with the client abstraction management layer, wherein the client abstraction management layer is in communication with the client and each object manager installed on each of the plurality of managed objects; and
        generate with the client abstraction management layer a management layer request for information from said client abstraction management layer database;
        generate a response for the request for information directed to the one of a plurality of managed objects from said client abstraction management layer database;
        wherein the updating of the client abstraction management layer database is periodically effected.

7. The system of claim 6, further comprising instructions that when carried out cause the system to:

receive requested information in response to the request for information with the client abstraction management layer from said database wherein the updating of the client abstraction management layer database occurs when a change to the status of a managed object is detected.

8. The system of claim 7, further comprising instructions that when carried out cause the system to:
provide said requested information from the client abstraction management layer to said client.

9. The system of claim 8, further comprising instructions that when carried out cause the system to:
generating with the client abstraction management layer a client abstraction management layer request for information from an object manager of said model,
receiving with the client abstraction management layer requested information from said object manager,
providing said requested information from the client abstraction management layer to said client, and
updating said database with said requested information from said object manager.

10. The system of claim 6 wherein said object-oriented model is a common information model (CIM).

11. A computer readable medium having stored thereon instructions that when carried out on an information handling system cause the system to:
initialize a discovery process identifying managed objects of the information handling system;
add to a client abstraction management layer database created by a client abstraction management layer at least one new information of one of the plurality of managed objects within an object oriented model having object managers installed, wherein the client abstraction management layer database comprising at least one of a plurality of database tables based on at least one parameter able to identify the each of the plurality of managed objects, the information is updatable, and said database is created when said instructions are installed on said system;
update the client abstraction management layer database with changes to the at least one parameter, wherein the update to the client abstraction management layer database is periodically effected;
receive a client request from a client for information directed to one of the managed objects within the object oriented model;
intercept said client request to the one of the plurality of managed objects with the client abstraction management layer, wherein the client abstraction management layer is in communication with the client and each object manager installed on each of the plurality of managed objects; and
generate with the client abstraction management layer a management layer request for information from said database,
generate a response from said client abstraction management layer database to the request for information directed to the one of a plurality of managed objects.

12. The medium of claim 11 further comprising instructions that when carried out cause the system to:
receive with the client abstraction management layer the requested information from said database and wherein the step the update to the client abstraction management layer database occurs when a changed status of a managed object is detected.

13. The medium of claim 11 further comprising instructions that when carried out cause the system to:
provide said requested information from the client abstraction management layer to said client.

14. The medium of claim 11 further comprising instructions that when carried out cause the system to:
generating with the client abstraction management layer a client abstraction management layer request for information from an object manager of said model,
receiving with the client abstraction management layer requested information from said object manager,
providing said requested information from the client abstraction management layer to said client, and
updating said database with said requested information from said object manager.

15. The medium of claim 11 wherein said object-oriented model is a common information model (CIM).

16. The method of claim 1, wherein initiating a discovery process is triggered by an indication that at least one change of the information stored in the client abstraction management layer database occurs.

* * * * *